United States Patent [19]

Doro

[11] 4,366,899
[45] Jan. 4, 1983

[54] TORQUE LIMITING DEVICE FOR ROLLER CONVEYOR LIVE ROLLER

[76] Inventor: Robert J. Doro, 8822 Greenview La., Greendale, Wis. 53129

[21] Appl. No.: 880,432

[22] Filed: Feb. 23, 1978

[51] Int. Cl.³ .............................................. B65G 13/06
[52] U.S. Cl. .................................................... 198/781
[58] Field of Search ................ 198/781, 789, 791, 857

[56] References Cited

U.S. PATENT DOCUMENTS 2,712,377  7/1955  Eggleston ........................... 198/789

Primary Examiner—Joseph E. Valenza
Attorney, Agent, or Firm—James R. Custin

[57] ABSTRACT

A live roller for a roller conveyor has a torque limiting connection with drive mechanism whereby the roller is normally rotatably driven, enabling the roller to be stopped by a predetermined resistance to its rotation. The connection comprises a coaxial shaft portion on the roller on which a sprocket is rotatable and axially slideable. An endless chain of the drive mechanism drives the sprocket, which comprises a driving clutch member having axially opposite friction surfaces, one of which engages an opposing friction surface on a driven clutch member fixed to the shaft portion. A second driven clutch member, constrained to rotate with the shaft portion but slideable along it, has a friction surface opposingly engaging the other friction surface on the sprocket. A coiled expansion spring, surrounding the shaft portion and reacting between a lock nut threaded thereon and the second driven member, maintains the friction surfaces engaged under bias.

4 Claims, 3 Drawing Figures

TORQUE LIMITING DEVICE FOR ROLLER CONVEYOR LIVE ROLLER

This invention relates to roller conveyors of the type comprising numerous parallel horizontal rollers, at least certain of which are live rollers that are rotatably driven to cause a load unit on the conveyor to be transported in one direction; and the invention is more particularly concerned with unusually simple and effective means for enabling such a conveyor to accommodate itself automatically to stoppages of conveyed load units.

In roller conveyors having rotatably driven rollers, two general expedients have been devised for preventing damage to a load unit being conveyed in case the load unit encounters an obstruction that interferes with its forward progress.

One of these arrangements, primarily intended for preventing pile-ups of successive load units, is exemplified by U.S. Pat. No. 3,122,232 to Burt and U.S. Pat. No. 3,840,110 to Molt et al. In these, sensor or trigger devices are mounted at intervals along the conveyor. When one of these devices is engaged by a load unit, the device effects declutching of a group of live rollers in a section of the conveyor behind the device, to stop rotation of those rollers. Thus, if for any reason the load unit that triggered the sensing device is unable to move past that device, a following load unit, resting upon the declutched rollers, is prevented from overriding and crushing the triggering load unit. As soon as the triggering load unit passes out of engagement with the sensing device, the rollers in the section behind that device are reconnected with their driving means so that the following load unit can resume its forward motion.

Such a sensing arrangement can protect a leading load unit from being crushed by load units that follow it, but—like a railroad block signal system, to which it is comparable in many respects—it cannot provide protection for a load unit that is being permitted to advance. Thus, if a firm or heavy obstruction is placed in the path of an article being conveyed, the conveyor tries to drive the article through that obstruction. Obviously little is gained in such a case from the ability of the mechanism to prevent following load units from piling up against the arrested one. A further disadvantage of such an arrangement is that it is operative in only one direction and therefore cannot be used with a reversible conveyor.

The second of the above-mentioned general arrangements for preventing damage to an arrested load unit is exemplified by U.S. Pat. No. 3,605,990 to Cowen, Jr. and U.S. Pat. No. 3,567,010 to Vom Stein. In these, each of the rotatably driven rollers is connected with its drive means through a torque limiting clutch. When a load unit being moved along the conveyor encounters an obstacle that resists its forward motion, an increased torque force is required for rotating the roller which supports that load unit, due to friction between that roller and the arrested article. However, the torque limiting device permits the drive means to apply only a predetermined maximum torque to each live roller; and when more than that maximum torque is needed to rotate the roller, the roller stops, even though the drive mechanism continues to run. The torque value at which slippage occurs is suited to the weight of the load units to be conveyed and to the friction between the roller and a typical load unit.

Of course, even though a roller is stopped, torque continues to be applied to it, and therefore the roller tends to urge the arrested article forwardly; but the force exerted upon the load unit is limited to a value small enough to avoid damage to it. Furthermore the roller does not rotate relative to the stationary load unit, so that neither the load unit nor the roller is subjected to wear or abrasion. Although following load units can pile up against an arrested article, the force that they can impose upon it is limited to a safe value.

Such torque limiting clutch arrangements are satisfactory in theory, but those that have heretofore been available for roller conveyor live rollers have possessed serious disadvantages that rendered them unsatisfactory in practice. The arrangement disclosed in the above mentioned U.S. Pat. No. 3,567,010 appears to be reasonably long-lived, dependable and consistent, but it is also relatively expensive to manufacture and to assemble. Because of its complexity, any repairs that might be needed also tend to be expensive and time-consuming. Another objection to it is that the mechanism cannot be adjusted to accommodate different kinds of articles because the torque value at which each roller is effectively disengaged from its drive mechanism cannot be altered without disassembling the mechanism and replacing its springs or replacing or remanufacturing other parts. In consequence, a given conveyor embodying that disclosed mechanism is not readily adaptable to load units of substantially varying weights and sizes and therefore has a rather limited utility.

The torque limiting clutch arrangement of U.S. Pat. No. 3,605,990 was capable of being adjusted to adapt a conveyor embodying it for handling loads of a wide range of weights and to provide for varying sensitivity as to drag. However, the mechanism was relatively expensive to manufacture and assemble, inasmuch as it comprised numerous parts, some of them rather intricately shaped. It must be borne in mind that there are usually a large number of live rollers along the length of a roller conveyor, and therefore the cost of a torque-limiting mechanism for each such roller, multiplied by the number of live rollers in the conveyor, can represent a very substantial part of the cost of the conveyor as a whole.

Where high cost was not an insurmountable objection, prior torque limiting devices for the live rollers of roller conveyors met with commercial rejection because they were regarded as undependable. In col. 1 of U.S. Pat. No. 3,567,010, for example, it is pointed out that prior torque limiting devices needed frequent maintenance and adjustment and were susceptible to overheating that caused excessive wear and tended to change the critical torque value at which the driving member slipped relative to the driven one. A similar comment concerning undesirable heat build-up in live roller torque limiting devices is found in the introductory portion of U.S. Pat. No. 3,840,110.

Since the patents that contain these criticisms disclose torque limiting devices which, in themselves, have very evident and significant disadvantages, it must be concluded that the provision of a completely satisfactory torque limiting device for a live roller of a roller conveyor has heretofore been unobvious to those skilled in the art, and that the present invention solves a long-standing problem that has defied repeated and rather ingenious attempts at its solution.

With the foregoing considerations in mind, it is the general object of this invention to provide a simple, very inexpensive and very dependable torque limiting device for a live roller of a roller conveyor, whereby the roller is permitted to stand still when it encounters more than a predetermined resistance to its rotation while the drive means that powers the roller continues to operate in a normal manner so that the roller can resume its powered rotation as soon as the resistance to such rotation is reduced below the critical value.

Another and very important object of this invention is to provide an extremely simple and inexpensive torque limiting device for a live roller of a roller conveyor, which device is very quickly and easily adjustable to any of a wide range of critical torque settings, so that a roller conveyor embodying devices of this invention can be very versatile, being readily adaptable to transport any of a great variety of load units.

It is also a specific object of this invention to provide a torque limiting device for a roller conveyor that tends to run cool, even during frictional slipping between driving and driven members, and which consistently maintains a critical torque value for which it is adjusted, even after a prolonged period of slippage.

It is also an object of this invention to provide a torque limiting device for a roller conveyor live roller that is very easy to service and maintain but is nevertheless very sturdy and durable so that service and repair are seldom needed.

Further specific objects of the invention include the provision of a live roller arrangement for a roller conveyor that comprises a torque limiting device of the character described, which arrangement possesses the advantages of: extreme simplicity and low cost; very small number of parts requiring a minimum of machining and arranged for quick and easy assembly; low roller weight and rotational inertia; minimum number of bearings; overall compactness notwithstanding large total friction surface area that avoids concentrated heat build-ups during slippage; extreme ease of adjustability; and capability for operating equally well in either direction of roller rotation.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
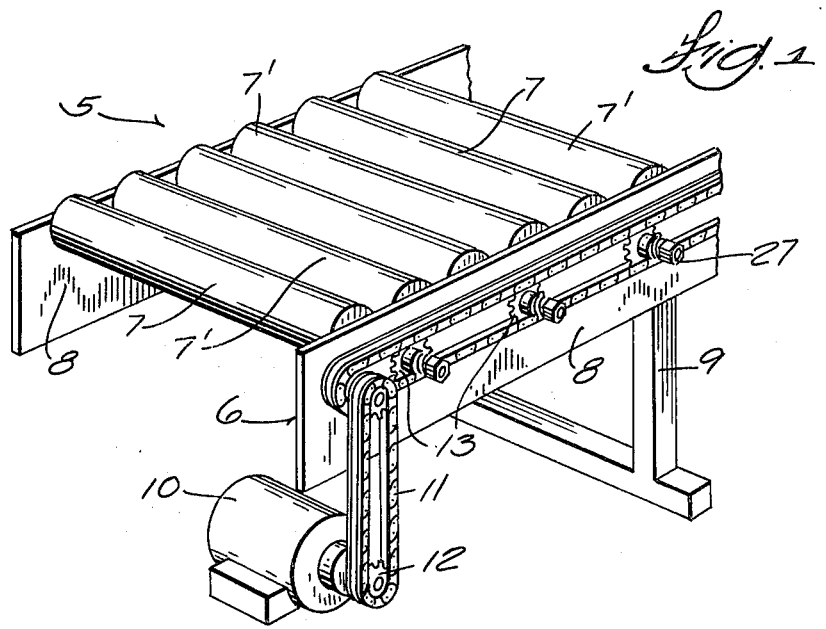
FIG. 1 is a perspective view of a portion of a roller conveyor having live rollers that embody the principles of this invention.
Figure 2:
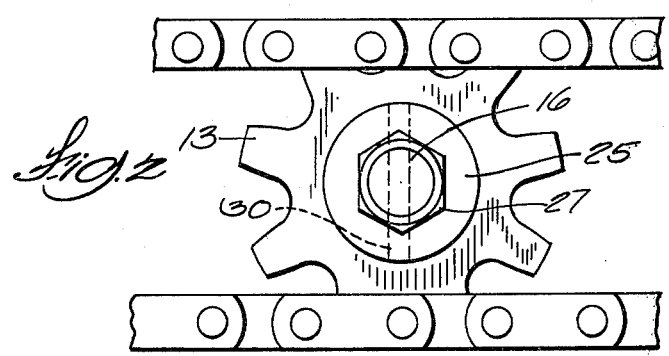
FIG. 2 is a fragmentary view in side elevation of the roller conveyor shown in FIG. 1, as seen from the side of the conveyor at which the drive means is located.

Referring now to the accompanying drawings, the numeral 5 designates generally a roller conveyor of a type which is generally conventional in that it comprises an elongated frame 6 and numerous horizontally extending rollers 7 that are carried by the frame in parallel, closely spaced relation to one another. The frame 6 comprises a pair of elongated side members 8 that are spaced apart laterally and are supported on suitable uprights 9. The rollers 7 have their axes transverse to the side members 8, and each roller extends substantially across the space between the side members.

At least certain of the rollers 7 are so-called live rollers that are rotatably driven by means of a drive mechanism comprising an electric motor 10 and an endless transmission element 11. The endless transmission element 11 could be, for example, a V-belt trained over driving and driven pulleys, but it is illustrated as a drive chain trained over a driving sprocket 12 on the motor 10 and over driven sprockets 13, one for each of the live rollers. As illustrated, the conveyor 5 has a freely rotatable undriven roller 7' between each pair of live rollers, although it will be understood that all of the rollers could be live ones, or that two or more undriven rollers could be arranged between successive live rollers along the length of the conveyor.

Figure 3:
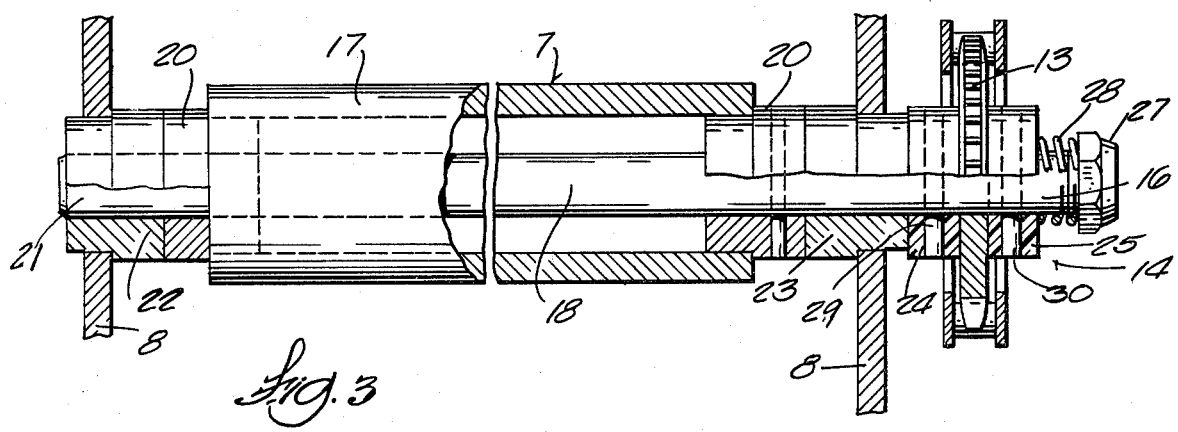
FIG. 3 is a view in section taken substantially on the plane of the line 3—3 in FIG. 2.

The connection between each live roller 7 and its coaxial driven sprocket 13 comprises a torque limiting clutch 14 that enables the roller to stand still when its rotation is resisted by more than a predetermined torque force but nevertheless allows its sprocket 13 to continue in rotation. The torque limiting clutch 14 for each live roller is mounted on a coaxial shaft portion 16 of the roller that projects axially outwardly a distance beyond one of the side members 8 of the frame. The shaft portion 16, which is constrained to rotate with the roller, can be formed in any suitable manner as a reduced diameter extension of the roller proper, but the preferred construction, best seen in FIG. 3, has the advantage of providing an inexpensive and light-weight roller with low rotational inertia that minimizes slippage during acceleration and deceleration of the roller.

As illustrated, the roller structure comprises a section of pipe or tube 17 that is long enough to span at least a major portion of the distance between the side members 8 of the frame, and a substantially longer shaft 18. The pipe or tube 17, which provides the roller proper, has an inside diameter substantially larger than the diameter of the shaft 18, but the shaft and the tube are nevertheless coaxially connected and integrated with one another by means of a pair of sleeves or bushings 20 that surround the shaft, each received in an end portion of the tube and fixed to the tube as well as to the shaft. Because the roller is substantially hollow, it is light in weight, low in cost, and has relatively small rotational inertia. The exterior surface of the pipe or tube 17 can be coated with rubber or the like or can be knurled or otherwise arranged for good frictional engagement with load units to be transported on the conveyor.

Opposite end portions of the shaft 18 project axially beyond the ends of the tube 17 to provide for journalling the roller in the side members 8 of the frame. Thus a shorter end portion 21 of the shaft 18 is received in a bearing 22 that is fixed on one of the side members 8, while the other end portion of the shaft, which comprises the above mentioned shaft portion 16, extends through a similar bearing 23 on the other side member and projects axially a substantial distance outwardly beyond that side member. The sleeves or bushings 20 that secure the tube 17 to the shaft 18 project axially a short distance beyond their respective ends of the tube to provide axially oppositely facing shoulders which respectively engage the bearings 22 and 23 to confine the roller against end play.

In the torque limiting clutch mechanism 14, which is mounted on the axially outwardly projecting shaft portion 16, the driven sprocket 13 comprises a driving clutch member which is sandwiched between an axially inner driven clutch member 24 and an axially outer driven clutch member 25. Fixed on the extremity of the shaft portion 16 is an enlarged heat 27, and a coiled expansion spring 28, which surrounds the shaft portion 16, reacts between that head and the axially outer driven clutch member 25 to maintain the driven clutch members clampingly engaged with the driving clutch member.

The two driven clutch members 24, 25 can be substantially identical collars of a material such as durable high molecular plastic, e.g., nylon or polytetrafluoroethylene ("Teflon"). The inner driven clutch member 24 is fixed to the shaft 18, as by means of a cross pin 29, to be confined against all motion relative to the shaft. The outer driven clutch member 25 can likewise be secured to the shaft 18 by means of a cross pin 30 whereby it is confined against rotation relative to the shaft, but that driven clutch member has freedom for limited axial sliding motion by reason of the fact that the hole in the shaft 18 that receives the cross pin 30 is somewhat elongated lengthwise of the shaft.

The driving clutch member 13 is freely rotatable on the shaft portion 16 as well as slidable axially along it. Its rotation is transmitted to the shaft 18, and thus to the roller proper, by its frictional engagement with the driven clutch members 24 and 25. For such engagement the driving clutch member has a disc-like central portion that provides flat, axially opposite friction surfaces which respectively oppose a flat axially outer friction surface on the inner driven clutch member 24 and a flat axially inner friction surface on the outer driven clutch member 25. The spring 28 of course tends to maintain an axially inward clamping force upon the outer driven clutch member 25 whereby these several friction surfaces are maintained engaged with one another under axial bias.

Because of the frictional connection between the driving clutch member 13 and the driven clutch members 24, 25, only a limited torque force can be transmitted from the driving clutch member to the roller proper. Thus if the roller encounters more than a predetermined resistance to its rotation, the driving clutch member 13 slips relative to the driven clutch members 24, 25, which stand still with the roller even though the driving clutch member continues to rotate on the shaft portion 16.

The driving clutch member 13 is preferably of steel so that it can readily conduct heat due to frictional slipping between it and the driven clutch members 24, 25. Since the driven clutch members are preferably made of a plastic that has relatively low heat conductivity, most of the frictional heating due to slippage is transferred to the driving clutch member. Further, the driving clutch member has a diameter substantially larger than that of the driven clutch members, so that frictional heat is conducted radially outwardly in it, away from the friction surfaces and into its exposed peripheral portion, whence such heat can be readily transferred to the surrounding air. Because the driving clutch member continues to rotate while the roller is stopped, there is a relative air flow over its radially outer portion whereby it is cooled very effectively. Furthermore, if the peripheral portion of the driving clutch member is formed with sprocket teeth (as shown) for cooperation with a drive chain, or has gear teeth for cooperation with a driving worm or gear (not shown), such teeth further promote heat radiation. Concentrated heat build-ups at the friction surfaces are further prevented by the relatively large total friction surface area that results from there being two driven clutch members 24, 25, cooperating with opposite friction surfaces on the driving clutch member.

The limiting torque value at which slippage can occur between the driving clutch member 13 and the roller is dependent upon the axially inward biasing force which the spring 28 exerts upon the outer driven clutch member 25. To provide for adjustment of that spring force, and hence of the critical torque value, the head 27 against which the spring reacts is preferably a lock nut threaded onto the axially outer extremity of the shaft portion 16. To raise the value of the critical torque force at which slippage occurs, the nut 27 is adjusted axially inwardly along the shaft, thus increasing the force which the spring exerts upon the clutch members.

From the foregoing description taken with the accompanying drawings it will be apparent that this invention provides a live roller for a roller conveyor that is provided with a torque limiting device which is unprecedented in simplicity, low cost and dependability and which, in addition, is capable of operating equally well in both directions of roller rotation, can be quickly and easily adjusted to accommodate a wide variety of articles to be conveyed, and poses no heating problems even during prolonged periods of slippage.

Those skilled in the art will appreciate that the invention can be embodied in forms other than as herein disclosed for purposes of illustration.

The invention is defined by the following claims:

1. A live roller for a roller conveyor that comprises a pair of elongated, laterally spaced supporting elements by which said live roller and a plurality of other rollers are supported, with each of said rollers extending between said supporting elements and rotatable about a fixed axis that extends laterally to the supporting elements, said live roller being rotatably driven from drive means through clutch means so that an article resting on the rollers can be transported by them in a direction lengthwise of the supporting elements but said live roller is prevented from rotating if said article encounters a predetermined resistance to motion in said direction, said live roller being characterized by:

A. a coaxial shaft for said live roller having
  (1) a circular cross-section,
  (2) a uniform diameter along substantially its entire length,
  (3) a screw threaded portion at one end thereof, and
  (4) a length to extend across the space between said supporting elements and to have said threaded portion spaced a substantial distance outwardly beyond one of them;

B. bearing means cooperating with said shaft and each of said supporting elements to mount the shaft for rotation;

C. said roller being tubular and having an inside diameter larger than the diameter of said shaft;

D. a pair of annular bushings concentrically securing said roller to said shaft and cooperating with said bearing means to substantially confine the shaft against axial displacement relative to said supporting elements;

E. axially inner and outer collar-like driven clutch members on said shaft, between its threaded end portion and said one supporting element, each having a flat friction surface which axially faces the friction surface on the other;

F. a pin extending radially through the axially inner driven clutch member and transversely through the shaft to confine that clutch member against rotation and axial motion relative to the shaft;

G. a second pin extending radially through the axially outer driven clutch member and through an axially elongated slot in the shaft to confine that clutch member against rotation relative to the shaft but allow it to have limited axial motion relative to the shaft;

H. a coaxial driving clutch member rotatable and axially slidable on said shaft between said driven clutch members, said driving clutch member
  (1) having axially opposite flat friction surfaces which frictionally engage said friction surfaces on the respective driven clutch members, and
  (2) having a peripheral portion arranged for cooperation with said drive means to be rotatably driven thereby;

I. a nut on said threaded end portion of the shaft; and

J. a coiled expension spring surrounding the shaft and reacting between said nut and said axially outer driven clutch member to maintain the respective friction surfaces on the driving and driven clutch members engaged under axial bias.

2. The line roller of claim 1 wherein said drive means comprises an endless drive chain and wherein said driving clutch member comprises a sprocket drivingly engaged with said chain, further characterized by: said sprocket having a diameter substantially larger than the diameters of the driven clutch members so that radially outer portions of the sprocket are exposed to the air and can conduct heat away from said friction surfaces.

3. The live roller of claim 1, further characterized by:

K. a pin extending transversely through each of said annular bushings, the roller and said shaft to constrain the roller to rotation with the shaft and confine it against axial displacement relative to the shaft.

4. The live roller of claim 1 wherein each of said driven clutch members is of plastic.

* * * * *